United States Patent [19]

Paar

[11] Patent Number: 4,808,688

[45] Date of Patent: Feb. 28, 1989

[54] SELF-CROSSLINKING CATIONIC PAINT BINDERS CONTAINING BIURET GROUPS

[75] Inventor: Willibald Paar, Graz, Austria

[73] Assignee: Vianova Kunstharz, A.G., Werndorf, Austria

[21] Appl. No.: 182,358

[22] Filed: Apr. 18, 1988

[30] Foreign Application Priority Data

Apr. 17, 1987 [AT] Austria ................................. 967/87

[51] Int. Cl.$^4$ ............................................. C08G 18/80
[52] U.S. Cl. ................................................... 528/45
[58] Field of Search ........................................... 528/45

[56] References Cited

U.S. PATENT DOCUMENTS 4,711,934 12/1987 Paar et al. ........................... 523/414

*Primary Examiner*—Maurice J. Welsh
*Attorney, Agent, or Firm*—A. W. Breiner

[57] ABSTRACT

Self-crosslinking paint binders, water-soluble upon protonation, containing biuret groups are described based on reaction products of blocked isocyanate groups containing aminoalkylation products of phenols with 0.1 to 1.0 moles, calculated on the hydrogen atoms at the urea groupings, of a semi-blocked diisocyanate. Optionally the phenolic hydroxy groups can be totally or partially reacted with epoxy compounds. The products are particularly suited for the formulation of high-grade, corrosion-resistant electrodeposition paints.

11 Claims, No Drawings

SELF-CROSSLINKING CATIONIC PAINT BINDERS CONTAINING BIURET GROUPS

FIELD OF INVENTION

This invention relates to biuret groups containing self-crosslinking paint binders, water-soluble upon protonation, based on reaction products of blocked isocyanate groups containing aminoalkylation products of phenols and epoxy resins, into which the biuret groups are introduced through further reaction with a semi-blocked diisocyanate. The products of the invention are particularly suited for the formulation of high-grade electrodeposition paints.

BACKGROUND OF INVENTION

U.S. Pat. No. 4,711,934 discloses cationic paint binders which can be characterized through the schematic structure

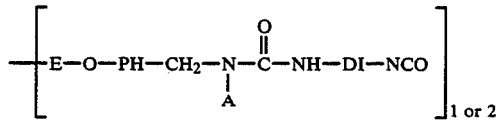

wherein
E—is the moiety of an epoxy compound,
—PH—is the moiety of a phenol,
A—is the moiety of an amine, and
—DI—NCO is the moiety of a semi-blocked diisocyanate.

Surprisingly, the products of the patent can be produced in a very simple manner and, upon protonation, provide water-dilutable paints with good applicational properties and, at a temperature as low as about 160° C., provide self-crosslinked films. It has been found, however, that coatings based on such products on various corrosion tests, such as salt spray or cycle tests, do not give the high values particularly required by the automobile industry. Further, adhesion to a variety of PVC-substrates as are used in the automobile industry as car underbody protection or as sealing materials could be further improved.

SUMMARY OF INVENTION

It has now been found that phenol condensates of the type disclosed in the '934 patent can be produced which, when formulated into coatings, have the required corrosion resistances and adhesion to PVC-substrates if prior to the reaction with the epoxy compound a biuret group is introduced into the compound through reaction of the hydrogen atom remaining on the urea grouping with a further semi-blocked diisocyanate. The present invention, therefore, is concerned with a process for producing self-crosslinking cationic paint binders, water-dilutable upon protonation, carrying biuret groups, based on blocked isocyanate groups containing aminoalkylation products of phenols and optionally epoxy reins, characterized in that a phenol condensate of the formula

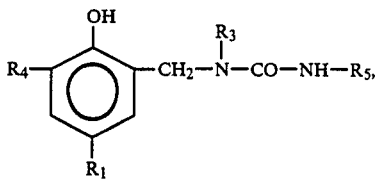

wherein
$R_1$ is a hydrogen atom, an alkyl radical, or one of the radicals

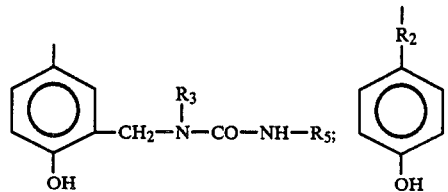

or

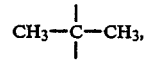

$R_2$ is the radical —$CH_2$— or $$CH_3-\underset{|}{\overset{|}{C}}-CH_3,$$

$R_3$ is an alkyl radical, a hydroxyalkyl radical, or a tertiary aminoalkyl radical,
$R_4$ is a hydrogen atom or, when $R_1$ is H, a hydrogen atom, or the radical —$CH_2$—N($R_3$)—CO—NH—$R_5$, and
$R_5$ is the radical of a diisocyanate semi-blocked with a monofunctional compound,
is reacted with 0.1 to 1.0 mole, calculated on the hydrogen atoms at the urea groupings, with at least one semi-blocked diisocyanate with the formation of biuret groups and, optionally, in a further reaction step, the phenolic hydroxy groups are totally or partially reacted with epoxy compounds, the quantity of basic groups being chosen in order that the final product has an amine value of at least 25 mg KOH/g.

The invention is further concerned with the cationic binders produced by the process and with the use of the cationic binders in water-dilutable paints, in particular in electrodeposition paints.

GENERAL DESCRIPTION OF INVENTION

The phenol-urea condensates used as intermediates herein are described in commonly assigned, U.S. Pat. No. 4,711,934, the disclosure thereof being incorporated herein by reference. As set forth therein, according to one method, the starting materials for producing the phenolic condensates can be aminoalkylation products of a phenol, a primary amine, and formaldehyde. The material can be linked at the NH-group with a semi-blocked diisocyantte (Method A). In a second method of preparation, the condensation of the phenol can be carried out with the reaction product of a semi-blocked diisocyanate with the primary amine and formaldehyde (Method B). Aminoalkylation products of phenols which, after corresponding modification, can also be used as starting materials according to the present invention are disclosed in commonly assigned U.S. Pat. No. 4,568,709, the disclosure thereof being incorporated herein by reference.

A group of condensation products particularly preferred for use in the present invention utilizes, as the starting materials, phenols with two nuclei of the type of diphenylol alkanes, such as bisphenol-A (4,4'-diphenylol propane) or bisphenol-F (4,4'-diphenylol methane). The formaldehyde preferably is used as paraformaldehyde with a $CH_2O$-content of about 85% to about 100%. Suitable primary aliphatic amines are the primary monoamines, such as butylamine and its isomers and higher homologues and/or primary alkanolamines, such as monoethanolamine and its homologues and the particularly preferred primary-tertiary diamines, such as N,N-dialkylaminoalkylene diamines exemplified by N,N-dimethylaminoethylamine and N,N-diethylaminopropylamine. Diprimary amines, such as ethylene diamine, and the homologues thereof can be coemployed with the above amines.

In a particularly preferred embodiment, the condensation is carried out whereby the components are heated to the temperature necessary for the azeotropic entrainment of reaction water, considering a possible exothermic reaction, in the presence of a solvent forming an azeotropic blend with water, such as toluol or a corresponding aliphatic hydrocarbon. After elimination of the calculated quantity of water, the solvent is vacuum-stripped and the reaction product is dissolved in an aprotic solvent. The reaction product thus obtained, carrying in the molecule an average of at least one secondary amino group, in a next step, is reacted at 30° C. to 50° C. with semi-blocked diisocyanates, whereby for each NH-group 1.1 to 2.0 moles of the isocyanate compound are used. Through the reaction of the NH-groups with the semi-blocked diisocyanates, the urea groupings as well as the desired biuret groups are formed. Hydroxyl groups which may be present, due to the preferred reaction of NH-groups with NCO-groups, are reacted only to a negligible extent. In using Method A for the preparation of the phenol-urea condensates, the reaction with the semi-blocked diisocyanates can be carried out jointly or in steps, optionally with various isocyanate compounds or with blends of various isocyanate compounds. In using Method B, the biuret formation, as is evident, is effected after the reaction of the phenols with formaldehyde and the reaction product of a semi-blocked diisocyanate, and the primary amine.

The semi-blocked diisocyanates are prepared in known manner; preferably diisocyanates are used wherein the NCO-groups have a different reactivity, such as toluylene diisocyanate or diisophorone diisocyanate. The preferred blocking agents are aliphatic monoalcohols which—optionally in the presence of conventional catalysts—split out under stoving conditions. Examples of other blocking agents are phenols, amines, unsaturated alcohols, caprolactame, and the like.

In an optional embodiment, in a last production step, the phenolic hydroxy groups can be reacted, with etherification, with epoxy compounds, preferably monoepoxy compounds, such as glycidyl esters, particularly the so-called KOCH-acids, or glycidylethers, such as 2-ethylhexylglycidylether. When using polyepoxy compounds, the higher functionality of the systems has to be considered and controlled. The reaction is carried out at 80° C. to 130° C. to an epoxy value of practically zero. Due to the basic groups in the molecule, normally additional catalysts are not necessary.

In the formulation of the products of the invention, care should be taken in order that the final products have the required basicity to guarantee an adequate stability of the aqueous solutions of the binders. The basicity, preferably due to tertiary amino groups, corresponding to an amine value of at least 25 mg KOH/g, is introduced in a first embodiment through the use of primary-tertiary diamines in the preparation of the condensation product, or, in a second embodiment, through the use of corresponding amines as blocking agents for semi-blocking the diisocyanates or through selection of the raw materials for the component carrying NH-groups. For obtaining water-dilutability, the basic groups of the reaction product are neutralized partially or totally with acids, preferably formic acid, acetic acid, or lactic acid. Normally, for dilution required in practice, a neutralization of 20%–60% of the basic groups is sufficient, or, a quantity of about 20 to 60 millimoles of acid per 100 g of resin solids. The binders are diluted with deionized water to the desired viscosity. Optionally, prior to or after neutralization or prior to dilution or in a partially diluted state, crosslinking catalysts, pigments, extenders, and other additives are added to prepare pigmented paints.

The formulation of pigment paints and the application of the paints through the electrodeposition process are known to one skilled in the art and are referred to in literature. The deposited films are cured, as primers, at between 150° C. and 170° C. for 10 to 30 minutes. If the binders do not carry self-crosslinking structures to a sufficient extent, additional crosslinkers, such as blocked isocyanates or amine resins or phenolic resins, can be coemployed. With proper formulation, the products can also be applied by other methods such as dipping, roller coating, or spraying. Optionally, the binders can also be processed in organic solvents.

PRESENTLY PREFERRED EMBODIMENTS

The following examples illustrate the invention without limiting its scope. It is also noted that many of the products set forth in U.S. Pat. Nos. 4,711,934 and 4,568,709 can, with consideration of the functionality, be used to advantage as intermediate products.

All parts and percentages refer to parts and percentages by weight, unless otherwise stated. Molar ratios are referring to grams.

EXAMPLE 1

In a suitable reaction vessel, 228 parts (1 mole) bisphenol-A are reacted at 40° C. to 60° C. for 30 minutes, with occasionalcooling, with 260 parts (2 moles) diethylaminopropylamine and 66 parts (2 moles) paraformaldehyde (91% $CH_2O$). After addition of 675 parts toluol, the batch is heated to distillation temperature and the reaction water is entrained azeotropically. As soon as the calculated quantity of reaction water has been eliminated, the batch is cooled to 30° C. and, while cooling, 1064 parts (3.5 moles) of toluylene diisocyanate, semi-blocked with 2-ethylhexanol, are continuously added within 45 minutes. The temperature is held at 70° C. until an NCO-value of practically zero is attained. The toluol is vacuum-stripped and the product is dissolved in 675 parts diethyleneglycol dimethylether.

2251 parts of the solution as above prepared are mixed with a solution of 190 parts of an epoxy resin based on bisphenol-A and epichlorohydrin (epoxy equivalent weight about 190) and 250 parts (1 mole) of a glycidyl ester of a saturated tertiary $C_9$–$C_{11}$-monocarboxylic acid in 389 parts diethyleneglycol dimethylether and reacted at 95° C. to 100° C. to an epoxy value of zero. After addition of 40 millimoles of formic acid per 100 g of resin solids, the product can be processed to a 50% aqueous clear varnish. The clear varnish, after addition of 0.8% (calculated as metal) of dibutyltindiacetate, is cathodically deposited on steel and stoved at 140° C. for 25 minutes. The cured film has a chemical resistance corresponding to 300 methylethylketone double rubs.

Test Of A Pigmented Paint

A pigmented paint is prepared from the binder whereby 83 parts of a pigment paste containing in 100 parts of resin solids, 1 part carbon black, 12 parts basic lead silicate, and 147 parts titanium dioxide, are completed to a paint with 70 parts binder as resin solids, neutralized and diluted with deionized water to a solids content of 17%. The paint was deposited on zinc-phosphated steel wired as the cathode of an electrodeposition system and cured for 25 minutes at 150° C. With a dry film thickness of 20 μm, the panels, in the salt spray test ASTM-B-117-64, after 1600 hours of exposure, show underrusting at the cross-incision of a maximum of 2 mm. In the cycle test (1 cycle =4 hours salt spray+4 hours dry storage+16 hours humidity chamber), the panels after 40 cycles show underrusting of less than 2 mm.

EXAMPLE 2

In a suitable reaction vessel, 260 parts (2 moles) diethylaminopropylamine are reacted at 30° C. to 50° C., while cooling, in the presence of 675 parts toluol with 608 parts (2 moles) of toluylene diisocyanate semi-blocked with 2-ethylhexanol. At the end of the addition, all isocyanate groups are consumed.

228 parts (1 mole) bisphenol-A and 66 parts (2 moles) paraformaldehyde, 91%, are added to the batch. The batch is held for one hour at 75° C. to 80° C. and, subsequently, with rising temperature, the reaction water is entrained azeotropically. The toluol is vacuum-stripped and replaced by the same quantity of diethyleneglycol dimethylether.

The biuret formation is effected through addition of another 456 parts (1.5 moles) of the above-mentioned semi-blocked diisocyanate at 70° C. to 80° C. After two hours of reaction time at this temperature, the content of free isocyanate groups has fallen to zero.

As described in Example 1, the product is reacted further with the epoxy compounds and tested as a paint. The results of all tests are comparable to those of Example 1.

As will be apparent to one skilled in the art, various modifications can be made within the scope of the aforesaid description. Such modifications being within the ability of one skilled in the art form a part of the present invention and are embraced by the appended claims.

It is claimed:
1. Process for producing self-crosslinking cationic paint binders, water-dilutable upon protonation, comprising reacting (A) a phenol condensate of the formula

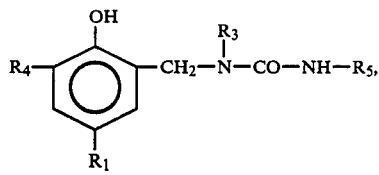

wherein
$R_1$ is a hydrogen atom, an alkyl radical, or one of the radicals

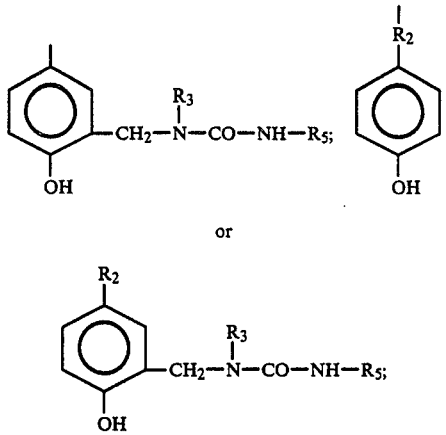

or $R_2$ is the radical —$CH_2$— or

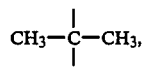

$R_3$ is an alkyl radical, a hydroxyalkyl radical, or a tertiary aminoalkyl radical,
$R_4$ is a hydrogen atom or, with $R_1$=H, a hydrogen atom or the radical —$CH_2$—N($R_3$)—CO—NH—$R_5$, and
$R_5$ is the radical of a diisocyanate semi-blocked with a monofunctional compound,
with (B) 0.1 to 1.0 mole, calculated on the hydrogen atoms at the urea groupings of component (A), of at least one semi-blocked diisocyanate, the reaction conditions being controlled to form biuret groups, and the quantity of basic groups being chosen whereby the final product has an amine value of at least 25 mg KOH/g.

2. The process according to claim 1 wherein the reaction product of (A) and (B) is reacted across the phenolic hydroxyl groups with an epoxy compound.

3. The process according to claim 1 wherein the phenol condensate carrying substituted urea groups is prepared by reacting an aminoalkylation product of a phenol, a primary amine, and formaldehyde with a semi-blocked diisocyanate.

4. The process according to claim 1 wherein the phenol condensate carrying substituted urea groups is prepared by condensing a reaction product of a primary amine and a semi-blocked diisocyanate with a phenol and formaldehyde.

5. The process according to claim 1 wherein the reaction product contains tertiary amine groups in a quantity corresponding to an amine value of at least 25 mg KOH/g which are introduced through the condensation products and/or the linking reaction and/or the tertiary alkanolamine used in semi-blocking the diisocyanate.

6. Self-crosslinking cationic paint binders, water-dilutable upon protonation, comprising the reaction product of (A) a phenol condensate of the formula

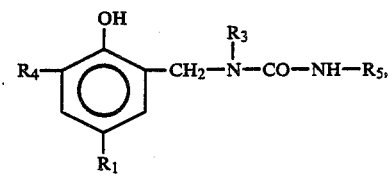

wherein

R$_1$ is a hydrogen atom, an alkyl radical, or one of the radicals

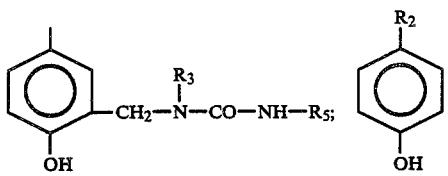

or

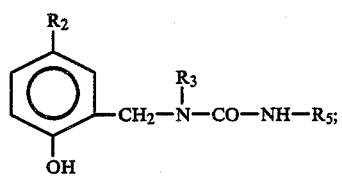

R$_2$ is the radical —CH$_2$— or

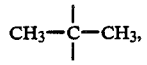

R$_3$ is an alkyl radical, a hydroxyalkyl radical, or a tertiary aminoalkyl radical, R$_4$ is a hydrogen atom or, with R$_1$=H, a hydrogen atom or the radical —CH$_2$—N(R$_3$)—CO—NH—R$_5$, and R$_5$ is the radical of a diisocyanate semi-blocked with a monofunctional compound, with (B) 0.1 to 1.0 mole, calculated on the hydrogen atoms at the urea groupings of component (A), of at least one semi-blocked diisocyanate, the reaction conditions being controlled to form biuret groups, and the quantity of basic groups being chosen whereby the final product has an amine value of at least 25 mg KOH/g.

7. The binders according to claim 6 wherein the reaction product of (A) and (B) is reacted across the phenolic hydroxyl groups with an epoxy compound.

8. The binders according to claim 6 wherein the phenol condensate carrying substituted urea groups is prepared by reacting an aminoalkylation product of a phenol, a primary amine, and formaldehyde with a semi-blocked diisocyanate.

9. The binders according to claim 6 wherein the phenol condensate carrying substituted urea groups is prepared by condensing a reaction product of a primary amine and a semi-blocked diisocyanate with a phenol and formaldehyde.

10. The binders according to claim 6 wherein the reaction product contains tertiary amine groups in a quantity corresponding to an amine value of at least 25 mg KOH/g which are introduced through the condensation products and/or the linking reaction and/or the tertiary alkanolamine used in semi-blocking the diisocyanate.

11. A cathodically depositable paint comprising the paint binders of any one of claims 6–10.

* * * * *